Patented June 16, 1942

2,286,837

UNITED STATES PATENT OFFICE 2,286,837

DYE FOR COLOR PHOTOGRAPHY

Merrill W. Seymour, Richard V. Young, and Jonas John Chechak, Rochester, N. Y., assignors to Eastman Kodak Company, Rochester, N. Y., a corporation of New Jersey No Drawing. Application May 7, 1940, Serial No. 333,808

16 Claims. (Cl. 95—2)

This invention relates to color photography and particularly to azo dyes for incorporation in photographic layers. Processes of color photography depending upon the chemical bleaching of dyes in the presence of developed silver images are well known. A process of this type in which azo dyes are employed in multi-layer coatings to produce colored images by bleaching the dyes in the presence of silver images is disclosed in Christensen U. S. Patent 1,517,049, granted November 5, 1924. In this process azo dyes are uniformly dispersed in gelatino silver halide layers and these layers are coated on a support. The film is exposed, developed and fixed and is then subjected to the action of a bleaching bath which destroys the dyes in the presence of the silver images but leaves the dye unaffected where there is no silver image. This results in the production of a natural color positive image directly.

It has been found that many of the dyes heretofore employed in processes of this type are objectionable for various reasons. Among these is the tendency of many of the azo dyes to wander from one layer to another and thereby to produce an unsatisfactory color picture. Where such wandering occurs it sometimes could be prevented by precipitating the dyes with organic bases although this means has the disadvantage of increasing the cost of preparing the dyed emulsions and frequently makes the incorporation of a sufficient concentration of the dye difficult owing to a tendency for the dye and the precipitate to separate out in crystals or flakes.

It is, therefore, an object of the present invention to provide dyes which do not diffuse through set gelatin or which diffuse only very slightly. A further object is to provide dyes for color photography which can be bleached readily in the presence of a silver image and which do not desensitize emulsions in which they are incorporated. Other objects will appear from the following description of our invention.

These objects are accomplished by incorporating in photographic layers dyes formed by coupling a tetrazotized diamino triphenylmethane with a phenol or a phenol or naphthol sulfonic acid.

The dyes which we propose to use are derived from diamino triphenylmethane and its homologues by tetrazotizing this base and coupling it with an aryl sulfonic acid, such as a sulfonated phenol or naphthol. The dyes formed in this way are not only resistant to diffusion through gelatin but also possess good bleaching properties and desirable spectral absorption bands for three-color photography but do not cause objectionable desensitization of emulsions in which they are incorporated.

These dyes are formed from diamino triphenylmethane bases which may be unsubstituted or substituted in any of the phenyl radicals. The triphenylmethane base is tetrazotized in the usual way using any known diazotizing reaction and is then coupled with a phenol or a phenol and naphthol sulfonic acid. Compounds suitable for use in this coupling reaction are p-cresol-2-sulfonic acid, 3-aminophenyl-6-sulfonic acid, 2-naphthol-3,6-disulfonic acid, commonly known as R-acid, 1-amino-8-naphthol-3,6-disulfonic acid, commonly known as H-acid, and others. When sulfonated amino phenols or naphthols such as 1-amino-8-naphthol-3,6-disulfonic acid are used, these compounds may contain acyl substituents on the nitrogen of the amino phenol or naphthol. The acyl group may contain a straight carbon chain of from 1 to 12 carbon atoms or a branched carbon chain such as isopropyl, isobutyl or secondary or tertiary amyl. These long chain acyl groups tend to decrease diffusion of the dye.

The following examples, which are illustrative only, indicate dyes which are suitable for use according to our invention.

The dye made by tetrazotizing one mole of 4,4'-diamino-2,2',5,5'-tetramethyltriphenylmethane and coupling it in alkaline medium with two moles of 2-naphthol-3,6-disulfonic acid is known as Brilliant Carmine L (Schultz Farbstofftabellen, vol. VII, No. 327, Color Index No. 357) and has the following structure:

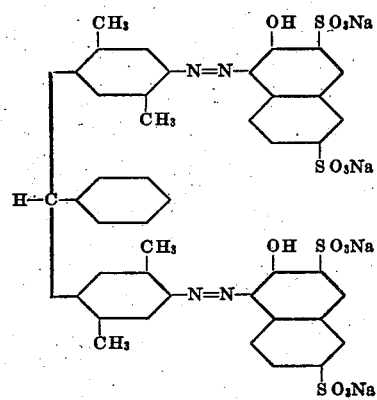

A more bluish-red dye of this class is made by tetrazotizing one mole of diamino triphenylmethane and coupling it in an alkaline medium with two moles of 1-lauroylamino-8-naphthol- 3,6-disulfonic acid. The resulting dye has the following structure:

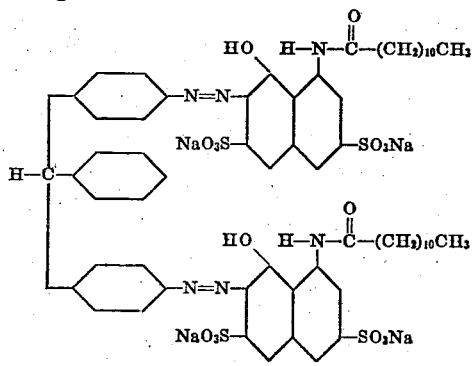

Another dye of this type is made by tetrazotizing one mole of 2,5,2′,5′-tetramethyl-4,4′-diaminotriphenylmethane and coupling it in alkaline medium with two moles of 1-acetylamino-8-naphthol-3,6-disulfonic acid. This dye has the following formula:

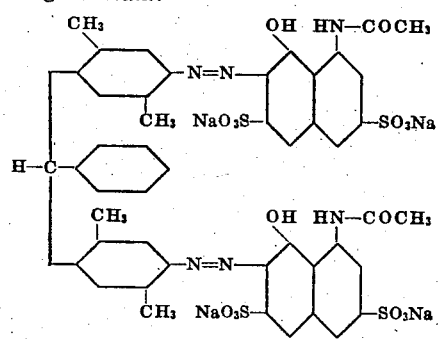

A yellow die is formed by tetrazotizing 2,5,2′,5′-tetramethyl-4,4′-diamino triphenyl methane and coupling with two molecules of p-cresol-2-sulfonic acid. This dye has the following formula:

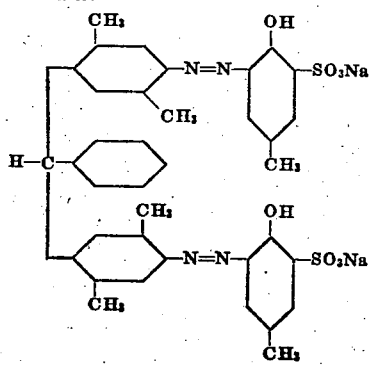

The dye formed by tetrazotizing 2,5,2′,5′-tetramethyl-4,4′-diamino triphenyl methane and coupling with 2 molecules of 3-aminophenol-6-sulfonic acid. This dye has the following formula:

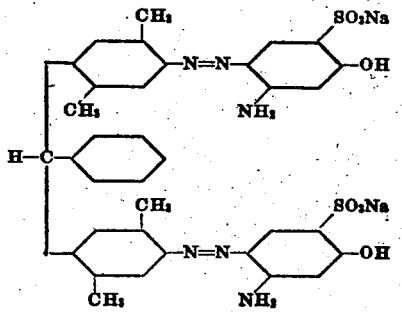

As illustrated by these examples, the position in the phenyl radicals of the triphenylmethane nucleus, ortho to the azo groups, may be either substituted or unsubstituted. The tendency of the dyes to diffuse is reduced when this position contains a substituent such as alkyl, carbalkoxy or halogen.

The compounds with which the tetrazotized diamino triphenylmethane bases are coupled may in some cases be considered naphthylamines when they contain an amino group as well as a hyydroxyl group. The second and third examples illustrate compounds of this type.

When used in photographic emulsion layers the dyes which we propose to use are incorporated in amounts of from about 2.5 grams to 50 grams of dye per 100 grams of gelatin. The emulsions are coated to give a dye concentration of from 0.15 to 1.5 grams of dye per square meter of emulsion surface.

Although the specific dyes which we have described are magenta or yellow in color, we are not limited to dyes of these hues as dyes of other colors may be formed according to the proposed method for use in photographic layers.

The dyes which we have described may be used with a process such as that of Christensen, U. S. Patent 1,517,049, with certain modifications or they may be used with other processes such as that described in Gaspar U. S. Patent 2,020,775 granted November 12, 1935. In the method described in the Christensen patent, the sensitive layers are uniformly colored a color complementary to that which they are designed to record. The blue sensitive layer is colored yellow, the green sensitive layer is colored magenta and the red sensitive layer is colored blue-green. The dyes used according to our invention may also be incorporated in layers sensitized for a color transmitted by the image forming dye. For example, the magenta dyes proposed according to our invention may be incorporated in a blue-sensitive layer or a red-sensitive layer as well as in a green-sensitive layer of a multi-layer coating. Our dyes may also be incorporated in non-sensitized photographic layers.

Our dyes may be incorporated in sensitive layers coated on transparent film supports such as cellulose nitrate or cellulose acetate or in sensitive layers coated on opaque supports such as paper or cellulose esters mixed with opaque white pigments. They may be used in single layer or multi-layer coatings or in multi-layer coatings on one or both sides of a support.

The dyes which we propose to use are readily bleached in the presence of a silver image by a suitable acid or alkaline bleaching solution, such as alkaline stannous chloride, acid thiourea or hydrochloric or hydrobromic acid containing suitable catalytic agents.

In certain cases the dyes may be bleached in the presence of a silver salt image rather than in the presence of a silver image.

It is to be understood that the specific examples described herein are illustrative only and that our invention is to be taken as limited only by the scope of the appended claims.

We claim:
1. A light-sensitive photographic element comprising a support having thereon a light-sensitive emulsion layer and a gelatin layer containing a substantially non-diffusing dye formed by coupling a tetrazotized diaminotriphenylmethane with the aromatic nucleus of an aryl sulfonic acid.

2. A light-sensitive photographic element comprising a support having thereon a light-sensitive emulsion layer and a gelatin layer containing a substantially non-diffusing dye formed by coupling a tetrazotized diaminotriphenylmethane with a naphthol sulfonic acid.

3. A light-sensitive photographic element comprising a support having thereon a light-sensitive emulsion layer and a gelatin layer containing a substantially non-diffusing dye formed by coupling a tetrazotized diaminotriphenylmethane with an aminonaphthol-3,6-disulfonic acid.

4. A light-sensitive photographic element comprising a support having thereon a light-sensitive emulsion layer and a gelatin layer containing a substantially non-diffusing dye formed by coupling a tetrazotized diaminotriphenylmethane with a naphthylamine disulfonic acid.

5. A silver halide layer for the bleach-out process of color photography uniformly colored with a dye formed by coupling a tetrazotized diaminotriphenylmethane with the aromatic nucleus of an aryl sulfonic acid.

6. A silver halide layer for the bleach-out process of color photography uniformly colored with a dye formed by coupling a tetrazotized diaminotriphenylmethane with a naphthylamine disulfonic acid.

7. A silver halide layer for the bleach-out process of color photography uniformly colored with a dye formed by coupling a tetrazotized diamino triphenyl-methane with a naphthol disulfonic acid.

8. A silver halide layer for the bleach-out process of color photography uniformly colored with a dye formed by coupling a tetrazotized diamino triphenylmethane with an amino-naphthol-disulfonic acid.

9. A silver halide layer for the bleach-out process of color photography uniformly colored with a dye formed by coupling a tetrazotized diamino triphenylmethane with an acylamino naphthol-3,6-disulfonic acid.

10. A multi-layer element for color photography, comprising a plurality of superposed gelatino-silver halide layers, at least one of which is uniformly colored with a substantially non-diffusing dye formed by coupling a tetrazotized diamino triphenylmethane with a naphthol disulfonic acid.

11. A multi-layer element for color photography, comprising a plurality of superposed gelatino-silver halide layers, at least one of which is uniformly colored with a substantially non-diffusing dye formed by coupling a tetrazotized diamino triphenylmethane with an amino-naphthol 3,6-disulfonic acid.

12. A multi-layer element for color photography, comprising a plurality of superposed gelatino-silver halide layers, at least one of which is uniformly colored with a substantially non-diffusing dye formed by coupling a tetrazotized diamino triphenyl methane with an acylamino-naphthol 3,6-disulfonic acid.

13. A multi-layer element for color photography comprising a plurality of superposed gelatino-silver halide layers, at least one of which is uniformly colored with a substantially non-diffusing dye having the following formula:

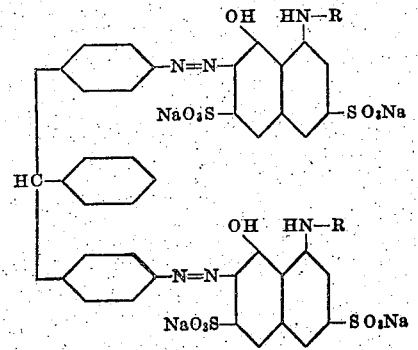

where R is an acyl radical.

14. A multi-layer photographic element having three superposed gelatino-silver halide layers on a single support, each of the layers being effectively sensitive to a different region of the visible spectrum and uniformly colored a color complementary to the color to which it is effectively sensitive, at least one of the layers being colored with a substantially non-diffusing dye formed by coupling a tetrazotized diamino triphenylmethane with a naphthol disulfonic acid.

15. A multi-layer photographic element having three superposed gelatino-silver halide layers on a single support, the layers being effectively sensitive respectively to the blue, green, and red regions of the visible spectrum and uniformly colored a color complementary to the color to which they are effectively sensitive, the green-sensitive layer being colored with a substantially non-diffusing dye formed by coupling a tetrazotized diamino triphenyl-methane with a naphthol 3,6-disulfonic acid.

16. A multi-layer element for color photography, comprising a plurality of superposed gelatino-silver halide layers, at least one of which is uniformly colored with a substantially non-diffusing dye formed by coupling a tetrazotized diamino triphenylmethane with a naphthylamine disulfonic acid.

MERRILL W. SEYMOUR.
RICHARD V. YOUNG.
JONAS JOHN CHECHAK.